US010623650B2

(12) United States Patent
He et al.

(10) Patent No.: US 10,623,650 B2
(45) Date of Patent: Apr. 14, 2020

(54) OPTICAL AXIS ADJUSTING MECHANISM AND CAMERA

(71) Applicant: Hangzhou Hikvision Digital Technology Co., Ltd., Hangzhou, Zhejiang (CN)

(72) Inventors: Jian He, Zhejiang (CN); Xinyou Chen, Zhejiang (CN); Hongwei Jiang, Zhejiang (CN); Wei Xu, Zhejiang (CN); Hangkai Zhang, Zhejiang (CN)

(73) Assignee: Hangzhou Hikvision Digital Technology Co., Ltd., Hangzhou, Zhejiang (CN)

( * ) Notice: Subject to any disclaimer, the term of this patent is extended or adjusted under 35 U.S.C. 154(b) by 7 days.

(21) Appl. No.: 15/769,930

(22) PCT Filed: Oct. 26, 2017

(86) PCT No.: PCT/CN2017/107796
§ 371 (c)(1),
(2) Date: Apr. 20, 2018

(87) PCT Pub. No.: WO2018/133474
PCT Pub. Date: Jul. 26, 2018

(65) Prior Publication Data
US 2019/0068887 A1 Feb. 28, 2019

(30) Foreign Application Priority Data
Jan. 20, 2017 (CN) ..................... 2017 2 0088360 U

(51) Int. Cl.
*H04N 5/232* (2006.01)
*H04N 5/225* (2006.01)
(Continued)

(52) U.S. Cl.
CPC ......... *H04N 5/23299* (2018.08); *F16M 11/04* (2013.01); *G03B 17/561* (2013.01);
(Continued)

(58) Field of Classification Search
CPC ............. H04N 5/23299; H04N 5/2251; H04N 5/2252; H04N 5/2258; G03B 17/561; F16M 11/04
See application file for complete search history.

(56) References Cited

U.S. PATENT DOCUMENTS 6,701,081 B1 * 3/2004 Dwyer .................... G03B 41/00
396/329
2006/0204240 A1 * 9/2006 Cameron ............. G03B 17/561
396/325
(Continued)

FOREIGN PATENT DOCUMENTS

CN 203595888 U 5/2014
CN 206450950 U 8/2017

*Primary Examiner* — Gevell V Selby
(74) *Attorney, Agent, or Firm* — Bret E. Field; Bozicevic, Field & Francis LLP

(57) ABSTRACT

Embodiments of the present application disclose an optical axis adjusting mechanism and a camera. The optical axis adjusting mechanism includes a first adjusting plate (2) and a second adjusting plate (3), wherein the first adjusting plate (2) and the second adjusting plate (3) are located outside the imaging unit housing (4). In embodiments of the present application, the first adjusting plate and the second adjusting plate are provided for adjusting a direction of an optical axis of an optical device provided in an imaging unit housing, and the first adjusting plate and the second adjusting plate are located outside the imaging unit housing, so that it is more convenient to installation and adjustment.

12 Claims, 5 Drawing Sheets

(51) Int. Cl.
*G03B 17/56* (2006.01)
*F16M 11/04* (2006.01)

(52) U.S. Cl.
CPC ......... *H04N 5/2251* (2013.01); *H04N 5/2252* (2013.01); *H04N 5/2258* (2013.01)

(56) References Cited

U.S. PATENT DOCUMENTS

2012/0007955 A1\* 1/2012 Fradenburgh ........ H04N 13/239
348/47
2016/0097966 A1\* 4/2016 Song ..................... G03B 35/08
396/428

\* cited by examiner

OPTICAL AXIS ADJUSTING MECHANISM AND CAMERA

The present application claims the priority to a Chinese Patent Application No. 201720088360.0, filed with State Intellectual Property Office of People's Republic of China on Jan. 20, 2017 and entitled "Optical Axis Adjusting Mechanism And Camera", which is incorporated herein by reference in its entirety.

TECHNICAL FIELD

Embodiments of the present application relate to the technical field of cameras, and particularly to an optical axis adjusting mechanism and a camera with the same.

BACKGROUND

An optical axis adjusting mechanism is a mechanism for adjusting a direction of an optical axis of a camera. Generally, an adjusting part is provided inside an imaging unit housing, which leads to an inconvenient adjustment. For example, a Chinese Patent No. 201420778261.1 discloses a remote infrared camera adjusting device and an infrared camera with the same. In this patent, after an installation is completed, an adjusting device is located inside an imaging unit housing. Thus, during adjustment, the corresponding adjusting device is required to be adjusted before being installed into the imaging unit housing. If the direction of the optical axis is found to be inappropriate after the adjusting device is installed into the imaging unit housing with a camera body, the adjusting device and the camera body need to be taken out and adjusted again. Thus, it is inconvenient to installation and adjustment.

SUMMARY

Embodiments of the present application provide an optical axis adjusting mechanism to overcome or at least reduce at least one of the above deficiencies in the prior art.

An embodiment of the present application provides an optical axis adjusting mechanism, including:

a first adjusting plate which is rotatably connected to a mounting bracket, an axis around which the first adjusting plate is rotated relative to the mounting bracket being a first rotation axis; and a second adjusting plate which has a connecting part for fixedly connecting with an imaging unit housing, the second adjusting plate being rotatably connected with the first adjusting plate, and an axis around which the second adjusting plate is rotated relative to the first adjusting plate being a second rotation axis, wherein the second rotation axis is at an angle to the first rotation axis, wherein, the first adjusting plate and the second adjusting plate are located outside the imaging unit housing.

Optionally, the first rotation axis is a first revolving axis, and the second rotation axis is a second revolving axis.

Optionally, the optical axis adjusting mechanism further includes a first rotation shaft, wherein the axis of the first rotation shaft is the first revolving axis, and the first rotation shaft includes a shaft rod section and a thread section which are connected to each other, wherein the shaft rod section is engaged with a corresponding shaft hole in the mounting bracket, and the thread section is screwed into a corresponding threaded hole in the first adjusting plate.

Optionally, a plurality of circular-arc through holes are provided in the mounting bracket, the circular-arc through holes extend in a circular arc shape with the axis of the first rotation shaft as a center, a plurality of connecting threaded holes are provided in the first adjusting plate, the first adjusting plate and the mounting bracket are fixedly connected by screwing fastening screws into corresponding connecting threaded holes through the circular-arc through holes, and the first revolving axis extends vertically.

Optionally, the optical axis adjusting mechanism further includes a first adjusting screw, wherein the first adjusting screw, whose axis is in a different plane from the first revolving axis, is screwed into the mounting bracket through a through hole in the first adjusting plate.

Optionally, a first pressure spring is sleeved outside the first adjusting screw, one end of the first pressure spring abutting against the first adjusting plate and the other end abutting against the mounting bracket.

Optionally, the optical axis adjusting mechanism further includes a second rotation shaft and a second adjusting screw, the axis of the second rotation shaft is the second revolving axis, and the second adjusting plate is pivotally connected with the first adjusting plate by the second rotation shaft, the second adjusting screw, whose axis is in a different plane from the second revolving axis, is screwed into the first adjusting plate through a through hole in the second adjusting plate.

Optionally, the optical axis adjusting mechanism further includes a second pressure spring sleeved outside the second adjusting screw, wherein one end of the second pressure spring abuts against the second adjusting plate and the other end abuts against the first adjusting plate, so as to limit a position where the second adjusting plate is rotated relative to the first adjusting plate around the second rotation shaft.

Optionally, the optical axis adjusting mechanism further includes a jackscrew, wherein the jackscrew, whose axis is parallel to the axis of the second adjusting screw, is screwed through a threaded hole in the first adjusting plate to abut against the second adjusting plate, so as to assist in limiting a position where the second adjusting plate is rotated relative to the first adjusting plate around the second rotation shaft.

An embodiments of the present application also provides a camera including a mounting bracket, a first imaging unit and a second imaging unit, wherein the first imaging unit is provided within a first imaging unit housing, the second imaging unit is provided within the second imaging unit housing, and the first imaging unit housing and/or the second imaging unit housing are connected to the mounting bracket by corresponding optical axis adjusting mechanisms described above.

Optionally, a cable channel is arranged between the mounting bracket and the first adjusting plate of the optical axis adjusting mechanism, which facilitates the arrangement of cables and can avoid the exposure of the cables and protect the cables.

In embodiments of the present application, a first adjusting plate and a second adjusting plate are provided for adjusting a direction of an optical axis of an optical device provided in an imaging unit housing, and the first adjusting plate and the second adjusting plate are located outside the imaging unit housing, so that it is more convenient to adjustment.

REFERENCE SIGNS

| | |
|---|---|
| 1 | mounting bracket |
| 2 | first adjusting plate |
| 3 | second adjusting plate |
| 4 | imaging unit housing |
| 11 | azimuth shaft hole |
| 12 | circular-arc through hole |
| 13 | collision avoidance hole |
| 14 | side linear opening |
| 21 | first rotation shaft |
| 22 | first pressure spring |
| 23 | first adjusting screw |
| 24 | fastening screw |
| 25 | connecting threaded hole |
| 26 | mounting screw |
| 31 | second rotation shaft |
| 32 | second pressure spring |
| 33 | second rotation shaft mounting hole |
| 34 | second adjusting screw |
| 35 | jackscrew |
| 36 | second adjusting screw hole |
| 211 | shaft rod section |
| 212 | thread section |
| 5 | first imaging unit |
| 6 | second imaging unit |

DETAILED DESCRIPTION

In the accompanying drawings, the same or similar reference signs are used to represent the same or similar elements, or elements with the same or similar functions. Embodiments of the present application will be described below in detail in conjunction with the accompanying drawings.

In the description of embodiments of the present application, the azimuth or position relationship indicated by terms "center", "longitudinal" and "lateral", "front" and "back", "left" and "right", "vertical" and "horizontal", "top" and "bottom", "inside" and "outside" and the like is the azimuth or position relationship based on the accompanying drawings. This is only used to facilitate and simplify the description of embodiments of the present application, rather than indicate or imply that the device or element must have the particular azimuth or must be constructed or operated in a particular azimuth, and thus shall not be constructed as a limitation to the protection scope of the present application.

In embodiments of the present application, an optical axis refers to the center line of a light beam (light pillar), or the symmetrical axis of an optical system. In embodiments of the present application, a dual optical axis refers to an optical axis (or a first imaging optical axis) of visible light and an optical axis (or the second imaging optical axis) of infrared light.

Figure 1:
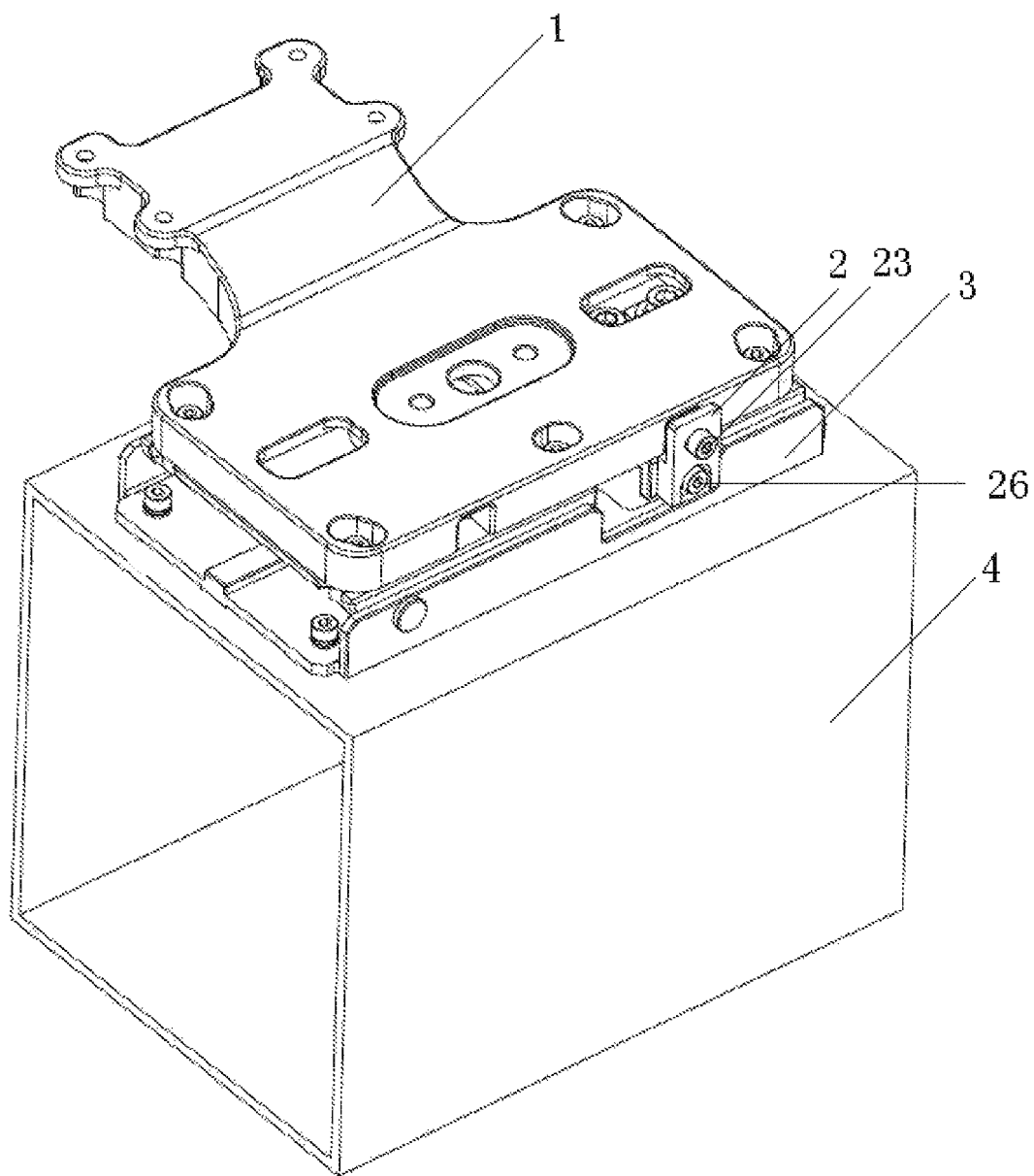
FIG. 1 is a schematic perspective view of an optical axis adjusting mechanism according to an embodiment of the present application.
Figure 2:
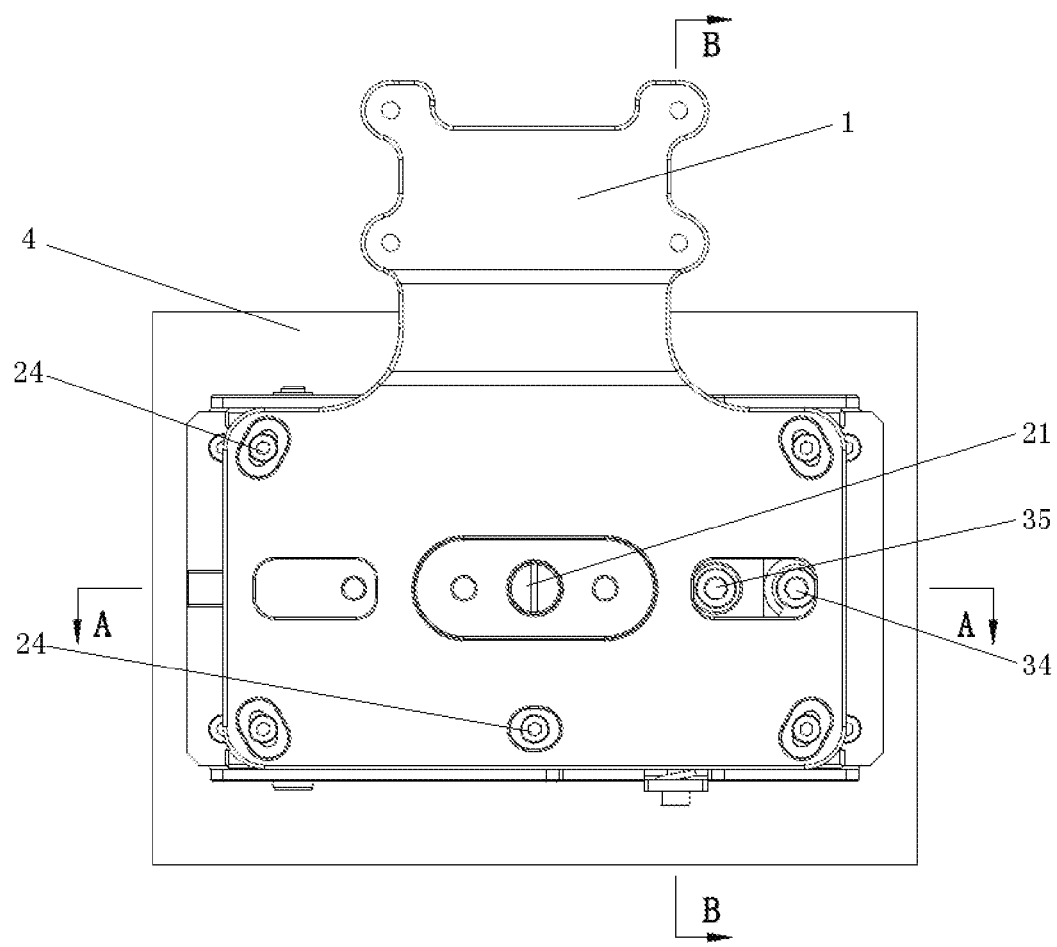
FIG. 2 is a schematic top view of the optical axis adjusting mechanism shown in FIG. 1.
Figure 3:
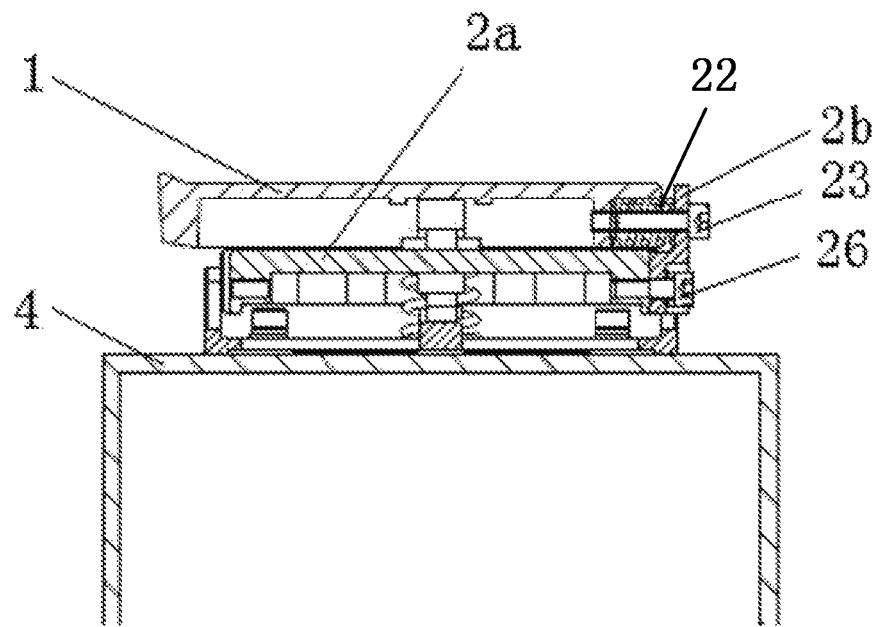
FIG. 3 is a schematic sectional view along the B-B line in FIG. 1.
Figure 4:
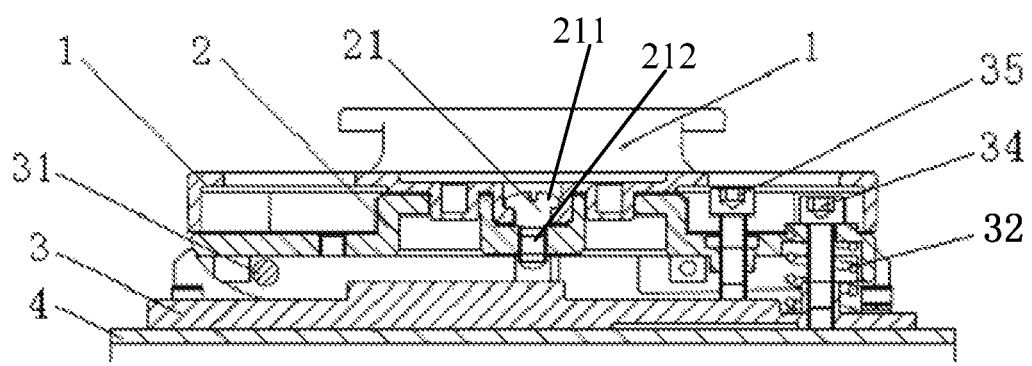
FIG. 4 is a schematic sectional view along the A-A line in FIG. 1.
Figure 5:
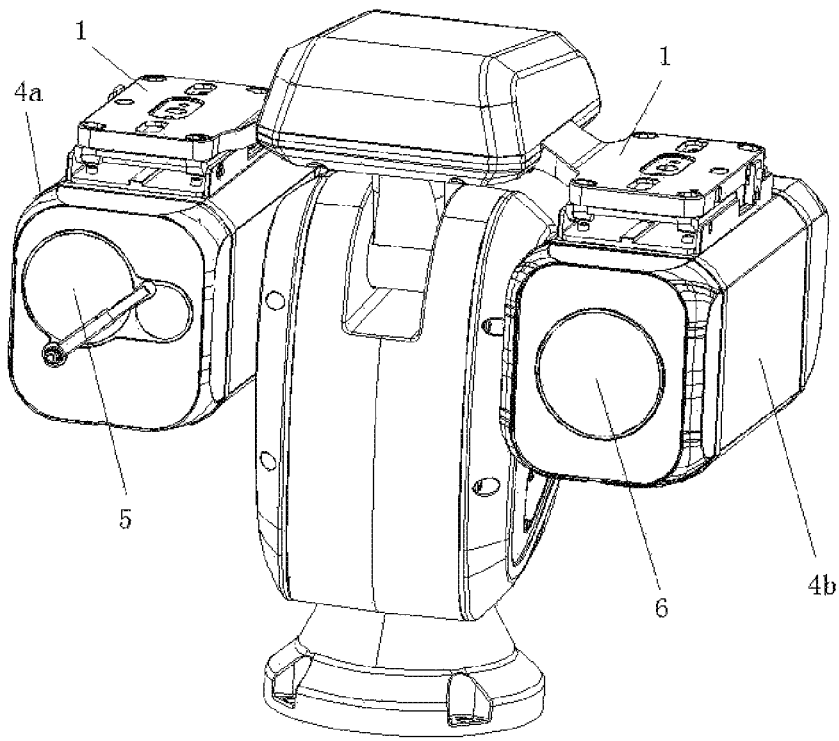
FIG. 5 is a schematic perspective view of a camera having the optical axis adjusting mechanism shown in FIG. 1.
Figure 6:
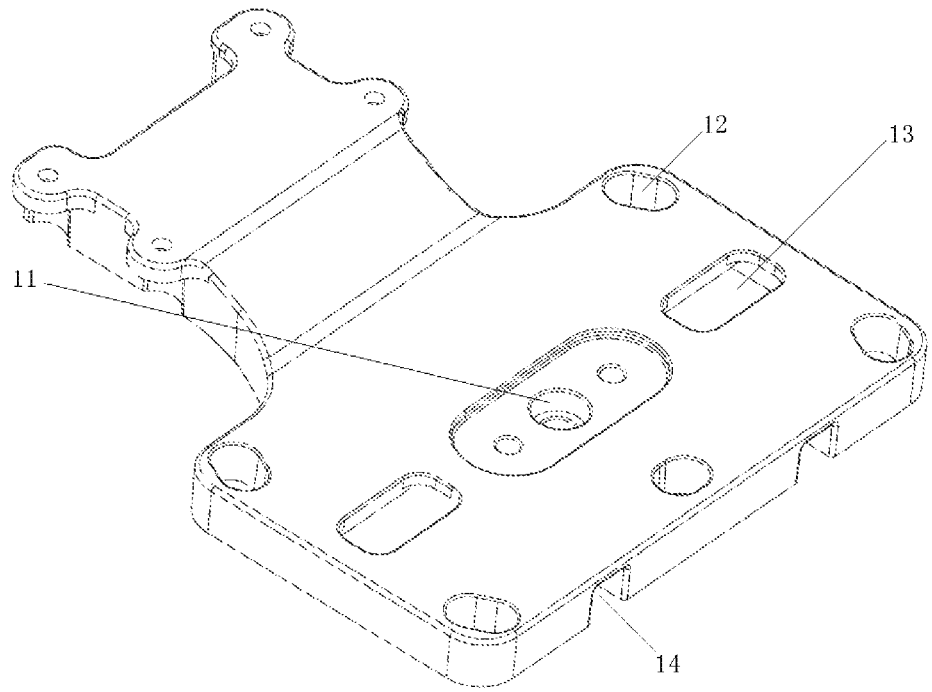
FIG. 6 is a schematic perspective view of a mounting bracket in the optical axis adjusting mechanism shown in FIG. 1.
Figure 7:
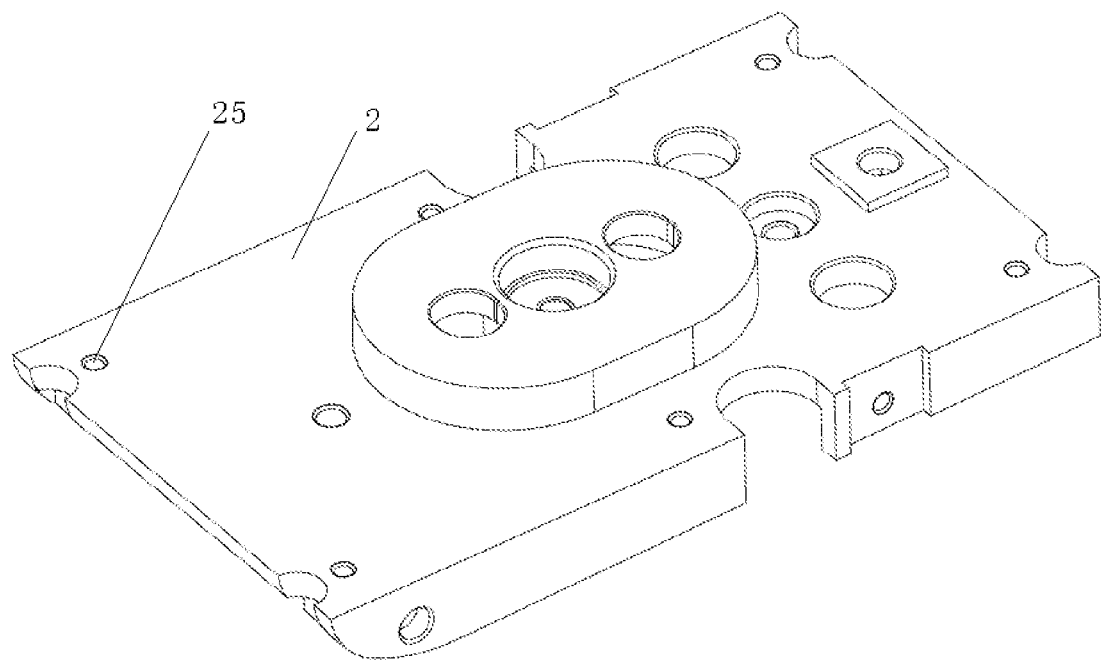
FIG. 7 is a schematic perspective view of a first adjusting plate in the optical axis adjusting mechanism shown in FIG. 1.
Figure 8:
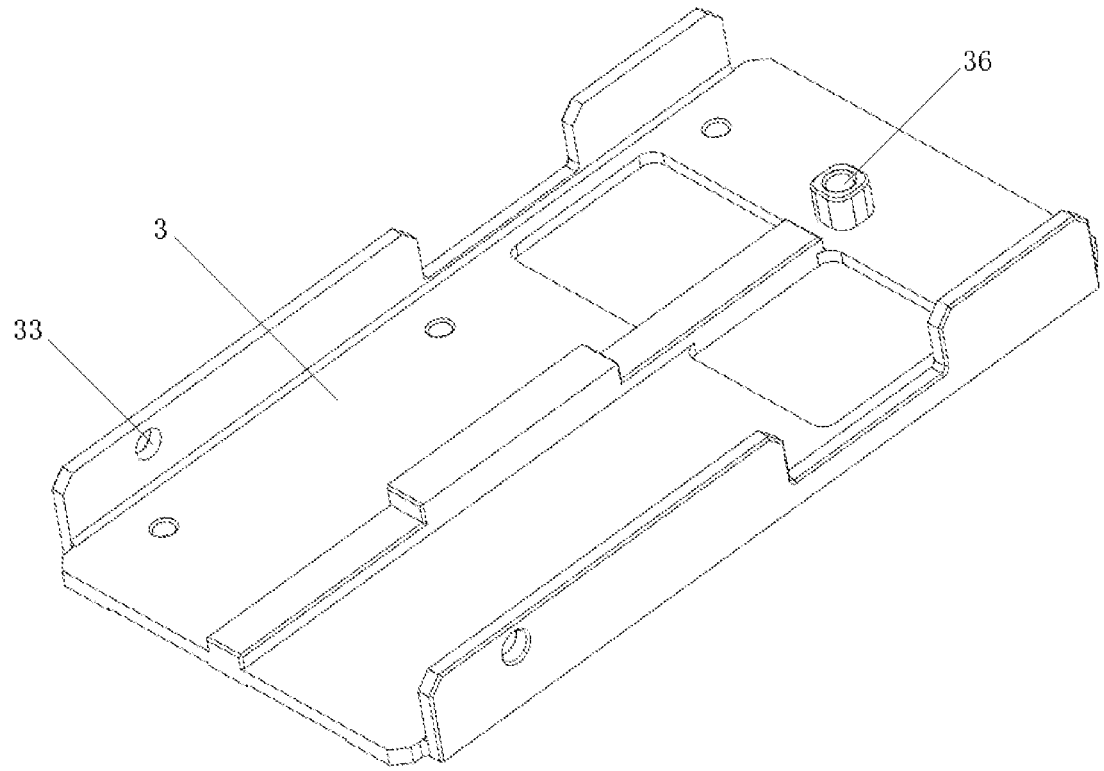
FIG. 8 is a schematic perspective view of a second adjusting plate in the optical axis adjusting mechanism shown in FIG. 1.

FIG. 1 is a schematic perspective view of an optical axis adjusting mechanism according to an embodiment of the present application. FIG. 2 is a schematic top view of the optical axis adjusting mechanism shown in FIG. 1. FIG. 3 is a schematic sectional view along the B-B line in FIG. 1. FIG. 4 is a schematic sectional view along the A-A line in FIG. 1. FIG. 5 is a schematic perspective view of a camera with the optical axis adjusting mechanism shown in FIG. 1. FIG. 6 is a schematic perspective view of a mounting bracket in the optical axis adjusting mechanism shown in FIG. 1. FIG. 7 is a schematic perspective view of a first adjusting plate in the optical axis adjusting mechanism shown in FIG. 1. FIG. 8 is a schematic perspective view of a second adjusting plate in the optical axis adjusting mechanism shown in FIG. 1.

The illustrated optical axis adjusting mechanism can include a first adjusting plate 2 and a second adjusting plate 3.

The first adjusting plate 2 is rotatably mounted to a mounting bracket 1, and configured to be rotatable relative to the mounting bracket 1 around a first rotation axis. The mounting bracket 1 can be a bracket on which the entire camera is mounted, or can be a bracket for connecting an imaging unit housing 4 to a camera body. The specific shapes and structures of the mounting bracket 1 and the first adjusting plate 2 are not limited to those in the illustrated embodiments.

The second adjusting plate 3 is configured to be fixedly connected to the imaging unit housing 4. The second adjusting plate 3 is rotatably connected to the first adjusting plate 2, and configured to be rotatable relative to the first adjusting plate 2 around a second rotation axis, wherein the second rotation axis can be perpendicular to the first rotation axis. The imaging unit housing 4 can be a housing which receives an imaging unit and the imaging unit is mounted in. The imaging unit housing 4 can be of any appropriate shape and structure, which is not limited to the illustrated embodiments. For example, the imaging unit housing 4 can be an integral member or an assembly assembled together by a plurality of separated members.

The second adjusting plate 3 is configured to be fixedly connected to the imaging unit housing 4, which can characterize that the second adjusting plate 3 and the imaging unit housing 4 are connected fixedly by a connecting part.

In an implementation, the first rotation axis can be a first revolving axis, and the second rotation axis can be a second revolving axis.

In the illustrated embodiment, the first revolving axis and the second revolving axis can be perpendicular in different planes. However, the embodiment of the present application is not limited to this. More specifically, the adjustment relative to the two rotation axes can be realized as long as a (non-zero) angle is formed between the first revolving axis and the second revolving axis, i.e., as long as the first revolving axis and the second revolving axis are not parallel or collinear. Advantageously, the first revolving axis can be provided vertically, and the second revolving axis can be provided perpendicularly to the first revolving axis to conveniently realize horizontal rotation and pitch adjusting. Further, the first revolving axis can be provided substantially at the center of the optical axis adjusting mechanism in downward projection, and the second revolving axis can be provided at an side of the optical axis adjusting mechanism in the downward projection.

The first adjusting plate 2 and the second adjusting plate 3 can be both located outside the imaging unit housing 4. On one hand, the direction of the optical axis of the optical device provided within the imaging unit housing can be conveniently adjusted, and on the other hand, it is more convenient to installation and adjustment.

The optical axis adjusting mechanism can further include a first rotation shaft 21. The first rotation shaft 21 can define the first revolving axis. Referring to FIG. 4, the first rotation shaft 21 can include a shaft rod section 211 and a thread section 212 which are connected to each other. The shaft rod section 211 can be engaged with a corresponding shaft hole in the mounting bracket 1, and the thread section 212 can be screwed into a corresponding threaded hole in the first adjusting plate 2.

Referring to FIGS. 2 and 6, a plurality of circular-arc through holes 12 can be provided in the mounting bracket 1. The circular-arc through holes 12 can extend in a circular arc shape with the axis of the first rotation shaft 21 as a center. Thus, the first adjusting plate 2 is allowable to rotate relative to the mounting bracket 1. In the illustrated embodiment, arc lengths of the circular-arc through holes 12 are relatively small. The arc lengths of the circular-arc through holes 12 can be increased as needed. Five connecting threaded holes 25 are provided in the first adjusting plate 2. The fixed connection between the first adjusting plate 2 and the mounting bracket 1 can be realized by screwing fastening screws 24 into the corresponding connecting threaded holes 25 through the circular-arc through holes 12.

In other words, as shown in FIGS. 2 and 6, "the circular-arc through holes 12 can extend in a circular arc shape with the axis of the first rotation shaft 21 as a center" can be understood as that distances from the centers of circular-arc through holes 12 to the axis of the first rotation shaft 21 are all identical, and the circular-arc through holes 12 are arranged along a circular arc whose center is the axis of the first rotation shaft 21 and whose radius is the distance from the center of a circular-arc through hole 12 to the axis of the first rotation shaft 21.

After the first rotation shaft 21 and the fastening screws 24 are unscrewed, the mounting bracket 1 may not abut tightly against the first adjusting plate 2 any more, and thus the mounting bracket 1 and the first adjusting plate 2 can rotate relative to each other to allow for adjusting azimuth. After the first rotation shaft 21 and the fastening screws 24 are screwed tightly, the mounting bracket 1 and the first adjusting plate 2 are firmly connected.

In an implementation, referring to FIG. 6, an azimuth shaft hole 11 can be provided in the mounting bracket 1. The first rotation shaft 21 can be screwed into a corresponding threaded hole in the first adjusting plate 2 through the azimuth shaft hole 11. The above action of screwing can represent that the first rotation shaft 21 is in threaded connection with the corresponding threaded hole in the first adjusting plate 2 through the azimuth shaft hole 11 by rotating and screwing.

Referring to FIG. 3, the optical axis adjusting mechanism can further include a first adjusting screw 23. The first adjusting screw 23, whose axis can be perpendicular to the first revolving axis, is screwed into the mounting bracket 1 through the through hole in the first adjusting plate 2, so as to adjust the relative position of the first adjusting plate 2 relative to the mounting bracket 1 around the first revolving axis. A first pressure spring 22 is sleeved outside the first adjusting screw 23. One end of the first pressure spring 22 can abut against the first adjusting plate 2 and the other end can abut against the mounting bracket 1. It can be understood that the axis of the first adjusting screw 23 is not necessarily perpendicular to the first revolving axis, and the above adjustment function can be realized as long as they are in different planes.

Referring to FIG. 3, the first adjusting plate 2 can include a body plate 2a and a connecting plate 2b which are connected to each other. The connecting plate 2b can be fixedly connected to the body plate 2a by a mounting screw 26. A mounting hole is provided in the connecting plate 2b and can be used to mount the first adjusting screw 23. It should be noted that, the body plate 2a and the connecting plate 2b can also be shaped integrally.

In an implementation, the first adjusting screw 23 can be an inner hexagon screw. Thus, the first adjusting screw 23 can be easily driven to perform azimuth adjustment.

In an implementation, the first adjusting screw 23 is screwed into a corresponding threaded hole in the first adjusting plate 2 and can abut against the mounting bracket 1 at an end. In this way, the first adjusting plate 2 can be pushed to rotate. Accordingly, a disc spring can be provided so that the mounting bracket 1 always abuts against an end of the first adjusting screw 23. In other words, the disc spring can apply a preloaded torque between the mounting bracket 1 and the first adjusting plate 2.

The optical axis adjusting mechanism can further include a second rotation shaft 31 and a second adjusting screw 34. The second rotation shaft 31 defines the second revolving axis, and the second adjusting plate 3 can be pivotally connected with the first adjusting plate 2 through the second rotation shaft 31. The second adjusting screw 34, whose axis can be perpendicular to the second revolving axis, is screwed into the first adjusting plate 2 through the through hole in the second adjusting plate 3. It can be understood that the axis of the second adjusting screw 34 is not necessarily perpendicular to the second revolving axis, and the above adjustment function can be realized as long as they are in different planes.

In an implementation, a second rotation shaft mounting hole 33 can be provided in the second adjusting plate 3, as shown in FIG. 8, which can be used to mount the second rotation shaft 31.

In an implementation, as shown in FIG. 4, the optical axis adjusting mechanism can further include a second pressure spring 32 sleeved outside the second adjusting screw 34. One end of the second pressure spring 32 can abut against the second adjusting plate 3, and the other end can abut against the first adjusting plate 2, so as to limit the pitching position of the second adjusting plate 3 relative to the first adjusting plate 2.

Referring to FIG. 4, the optical axis adjusting mechanism can further include a jackscrew 35 whose axis is parallel to that of the second adjusting screw 34. The jackscrew is screwed through a threaded hole in the first adjusting plate 2 to abut against the second adjusting plate 3, so as to assist in limiting the pitching position of the second adjusting plate 3 relative to the first adjusting plate 2. Referring to FIG. 6, a collision avoidance hole 13 is provided in the mounting bracket 1 to expose heads of the second adjusting screw 34 and the jackscrew 35 to facilitate the adjustment.

An embodiment of the present application further provides a camera provided with a mounting bracket 1, a first imaging unit 5 and a second imaging unit 6. The first imaging unit 5 can be provided within a first imaging unit housing 4a, and the second imaging unit 6 can be provided within a second imaging unit housing 4b. The first imaging unit housing 4a and the second imaging unit housing 4b can be connected to the mounting bracket 1 by a corresponding optical axis adjusting mechanism, wherein the optical axis adjusting mechanism can be an optical axis adjusting mechanism described above. By adjusting azimuths of the first imaging unit housing 4a and the second imaging unit housing 4b, the first optical axis of the first imaging unit 5 can coincide with the second optical axis of the second imaging unit 6, so that the first imaging unit 5 and second imaging unit 6 image the same area.

It can be understood that the above optical axis adjusting mechanism can be provided only for one imaging unit. In this case, the coincidence of the first optical axis of the first imaging unit 5 and the second optical axis of the second imaging unit 6 can be realized as well.

In an implementation, a cable channel can be arranged between the mounting bracket 1 and the first adjusting plate 2 of the optical axis adjusting mechanism. The cable channel can be in the form of a guiding slot enclosed by a reinforcing rib. Furthermore, the cable channel can be a reserved layout space. The arrangement of the cable channel facilitates the arrangement of cables, and can avoid the exposure of the cables and protect the cables. Therefore, the cables can extend (hidden from view) into the first imaging unit 5 and the second imaging unit 6 respectively from left and right sides of the host located in the middle through the cable channel. In an implementation, referring to FIG. 6, a side linear opening 14 can be provided at one side of the mounting bracket 1 close to the host.

Finally, it should be noted that the above embodiments are only for illustrating the technical solutions of embodiments of the present application without any limitation. A person skilled in the art can understand that technical solutions recited by various embodiments described above can be amended or equivalent replacements can be made for a part of the technical features therein. These amendments or replacements would not render the essence of corresponding technical solutions out of the spirit and range of the technical solutions of various embodiments of the present application.

The invention claimed is:

1. An optical axis adjusting mechanism, comprising:
    a first adjusting plate (2) which is rotatably connected to a mounting bracket (1), an axis around which the first adjusting plate (2) is rotated relative to the mounting bracket (1) being a first rotation axis;
    a second adjusting plate (3) which has a connecting part for fixedly connecting with an imaging unit housing (4), the second adjusting plate (3) being rotatably connected with the first adjusting plate (2), and an axis around which the second adjusting plate (3) is rotated relative to the first adjusting plate (2) being a second rotation axis, wherein the first rotation axis is at an angle to the second rotation axis, and
    a first rotation shaft (21), wherein the axis of the first rotation shaft (21) is a first revolving axis, and the first rotation shaft comprises a shaft rod section (211) and a thread section (212) which are connected to each other, wherein the shaft rod section (211) is engaged with a corresponding shaft hole in the mounting bracket (1), and the thread section (212) is screwed into a corresponding threaded hole in the first adjusting plate (2), wherein, the first adjusting plate (2) and the second adjusting plate (3) are located outside the imaging unit housing (4),
    wherein the first rotation axis is the first revolving axis, and the second rotation axis is a second revolving axis, and
    wherein a plurality of circular-arc through holes (12) are provided in the mounting bracket (1), the circular-arc through holes (12) extend in a circular arc shape with the axis of the first rotation shaft (21) as a center, a plurality of connecting threaded holes are provided in the first adjusting plate (2), the first adjusting plate (2) and the mounting bracket (1) are fixedly connected by screwing fastening screws (24) into corresponding connecting threaded holes through the circular-arc through holes (12), and the first revolving axis extends vertically.

2. The optical axis adjusting mechanism of claim 1, further comprising: a first adjusting screw (23), wherein the first adjusting screw (23), whose axis is in a different plane from the first revolving axis, is screwed into the mounting bracket (1) through a through hole in the first adjusting plate (2).

3. The optical axis adjusting mechanism of claim 2, wherein a first pressure spring (22) is sleeved outside the first adjusting screw (23), one end of the first pressure spring abutting against the first adjusting plate (2) and the other end abutting against the mounting bracket (1).

4. The optical axis adjusting mechanism of claim 1, further comprising: a second rotation shaft (31) and a second adjusting screw (34), wherein
    the axis of the second rotation shaft (31) is the second revolving axis, and the second adjusting plate (3) is pivotally connected with the first adjusting plate (2) by the second rotation shaft (31),
    the second adjusting screw (34), whose axis is in a different plane from the second revolving axis, is screwed into the first adjusting plate (2) through a through hole in the second adjusting plate (3).

5. The optical axis adjusting mechanism of claim 4, further comprising a second pressure spring (32) sleeved outside the second adjusting screw (34), wherein one end of the second pressure spring (32) abuts against the second adjusting plate (3) and the other end abuts against the first adjusting plate (2), so as to limit a position where the second adjusting plate (3) is rotated relative to the first adjusting plate (2) around the second rotation shaft (31).

6. The optical axis adjusting mechanism of claim 4, further comprising a jackscrew (35), wherein
    the jackscrew (35), whose axis is parallel to the axis of the second adjusting screw (34), is screwed through a threaded hole in the first adjusting plate (2) to abut against the second adjusting plate (3), so as to assist in limiting a position where the second adjusting plate (3) is rotated relative to the first adjusting plate (2) around the second rotation shaft (31).

7. A camera comprising a mounting bracket (1), a first imaging unit (5) and a second imaging unit (6), wherein the first imaging unit (5) is provided within a first imaging unit housing (4a), the second imaging unit (6) is provided within the second imaging unit housing (4b), and the first imaging unit housing (4a) and/or the second imaging unit housing (4b) are connected to the mounting bracket (1) by corresponding optical axis adjusting mechanisms according to claim 1.

8. The camera of claim 7, wherein a cable channel is provided between the mounting bracket (1) and the first adjusting plate (2) of the optical axis adjusting mechanism.

9. The optical axis adjusting mechanism of claim 1, further comprising: a first adjusting screw (23), wherein the first adjusting screw (23), whose axis is in a different plane from the first revolving axis, is screwed into the mounting bracket (1) through a through hole in the first adjusting plate (2).

10. The optical axis adjusting mechanism of claim 1, further comprising: a first adjusting screw (23), wherein the first adjusting screw (23), whose axis is in a different plane from the first revolving axis, is screwed into the mounting bracket (1) through a through hole in the first adjusting plate (2).

11. The optical axis adjusting mechanism of claim 1, further comprising: a first adjusting screw (23), wherein the first adjusting screw (23), whose axis is in a different plane from the first revolving axis, is screwed into the mounting bracket (1) through a through hole in the first adjusting plate (2).

12. The optical axis adjusting mechanism of claim 1, further comprising: a second rotation shaft (31) and a second adjusting screw (34), wherein the axis of the second rotation shaft (31) is the second revolving axis, and the second adjusting plate (3) is pivotally connected with the first adjusting plate (2) by the second rotation shaft (31), the second adjusting screw (34), whose axis is in a different plane from the second revolving axis, is screwed into the first adjusting plate (2) through a through hole in the second adjusting plate (3).

\* \* \* \* \*